United States Patent
Yang et al.

(10) Patent No.: US 10,575,189 B2
(45) Date of Patent: *Feb. 25, 2020

(54) NETWORK CONTROLLED BEAM SWEEPING

(71) Applicant: Verizon Patent and Licensing Inc., Arlington, VA (US)

(72) Inventors: Jin Yang, Orinda, CA (US); Yee Sin Chan, San Jose, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/148,529

(22) Filed: Oct. 1, 2018

(65) Prior Publication Data
US 2019/0124521 A1 Apr. 25, 2019

Related U.S. Application Data

(63) Continuation of application No. 15/790,270, filed on Oct. 23, 2017, now Pat. No. 10,123,218.

(51) Int. Cl.
*H01Q 3/26* (2006.01)
*H04W 16/28* (2009.01)
*H04W 64/00* (2009.01)
*H04W 28/02* (2009.01)
*H04W 60/04* (2009.01)
*H04W 84/18* (2009.01)

(52) U.S. Cl.
CPC ....... *H04W 16/28* (2013.01); *H04W 28/0215* (2013.01); *H04W 60/04* (2013.01); *H04W 64/006* (2013.01); *H04W 84/18* (2013.01)

(58) Field of Classification Search
CPC .......... H04W 16/28; H04W 4/29; H01Q 3/26
See application file for complete search history.

(56) References Cited

U.S. PATENT DOCUMENTS

| | | | | |
|---|---|---|---|---|
| 2007/0004399 | A1* | 1/2007 | Laiho | H04L 41/12 455/423 |
| 2012/0322388 | A1* | 12/2012 | Sawai | H04W 16/28 455/67.11 |
| 2013/0005297 | A1 | 1/2013 | Sanders et al. | |
| 2013/0005349 | A1* | 1/2013 | Sanders | G01S 3/30 455/456.1 |
| 2016/0268681 | A1* | 9/2016 | Hoole | H01Q 3/2611 |
| 2017/0373731 | A1* | 12/2017 | Guo | H04B 1/707 |

* cited by examiner

*Primary Examiner* — Myron Wyche

(57) ABSTRACT

A method for network controlled beam sweeping, may include receiving, at a network control device, location data associated with user equipment (UE) devices within a service area. The method may also include identifying, at each beam sweeping position of a plurality of beam sweeping positions, geo-bins having at least one UE device located within. The method includes receiving, at the network control device, networking requirements and traffic distribution data associated with the UE devices, and determining a sweeping weight for each identified geo-bin, where the sweeping weight is based on the networking requirements and the traffic distribution data associated with the at least one UE device in a geo-bin, and determining a sweeping factor for each beam sweeping position based upon the sweeping weights. The method may also include determining a beam sweeping pattern for all the beam sweeping positions based on the sweeping factors.

20 Claims, 8 Drawing Sheets

NETWORK CONTROLLED BEAM SWEEPING

CROSS REFERENCE TO RELATED APPLICATIONS

This application is a continuation of application Ser. No. 15/790,270, entitled "NETWORK CONTROLLED BEAM SWEEPING," filed Oct. 23, 2017, the contents of which are hereby incorporated herein by reference in its entirety.

BACKGROUND

Future wireless communications systems are expected to increase bandwidth and reduce latencies compared to current systems. Upcoming standards such as 5G and LTE Advanced Pro may improve performance through multiple input multiple output (MIMO) techniques, which may employ many antenna beams (e.g., 100-1000) to meet coverage requirements. The antenna beams may be swept (i.e., electronically steered) in a predetermined manner to adequately cover a service area.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Embodiments presented herein are directed to network controlled beam sweeping, where a single network element may control beam sweeping of radio nodes and/or user equipment (UE) devices within a service area based upon traffic distribution data, networking requirements (e.g., such as user service requirements and/or application service requirements) and/or prior beam sweeping history. As used herein, beam sweeping may be broadly defined to include steering, pointing, or directing an antenna beam, electronically and/or mechanically, to provide coverage to a desired region in a service area. Beam sweeping may be commonly applied to both transmission and reception beams, or separate controls may be applied independently to the transmission beam and reception beam. As used herein, the transmission beam is the antenna beam used to provide gain and directivity to the transmission signal, and the reception beam is the antenna beam used to provide gain and directivity to the received signal. In an embodiment, a network control device within the network may control and coordinate beam sweeping across radio nodes and/or UE devices. In an embodiment, the network control device may be a centralized, self-organizing network engine which has visibility into the traffic distribution patterns of the network. As used herein, a traffic distribution pattern may be characterized by traffic distribution data which represents, for example, the amount of data flowing through network elements and/or network branches interconnecting network elements. The traffic distribution data may include a time history of the amount of data, the location of the point of interest where the data stream is flowing, the types of data in the data stream, etc.

Figure 1:
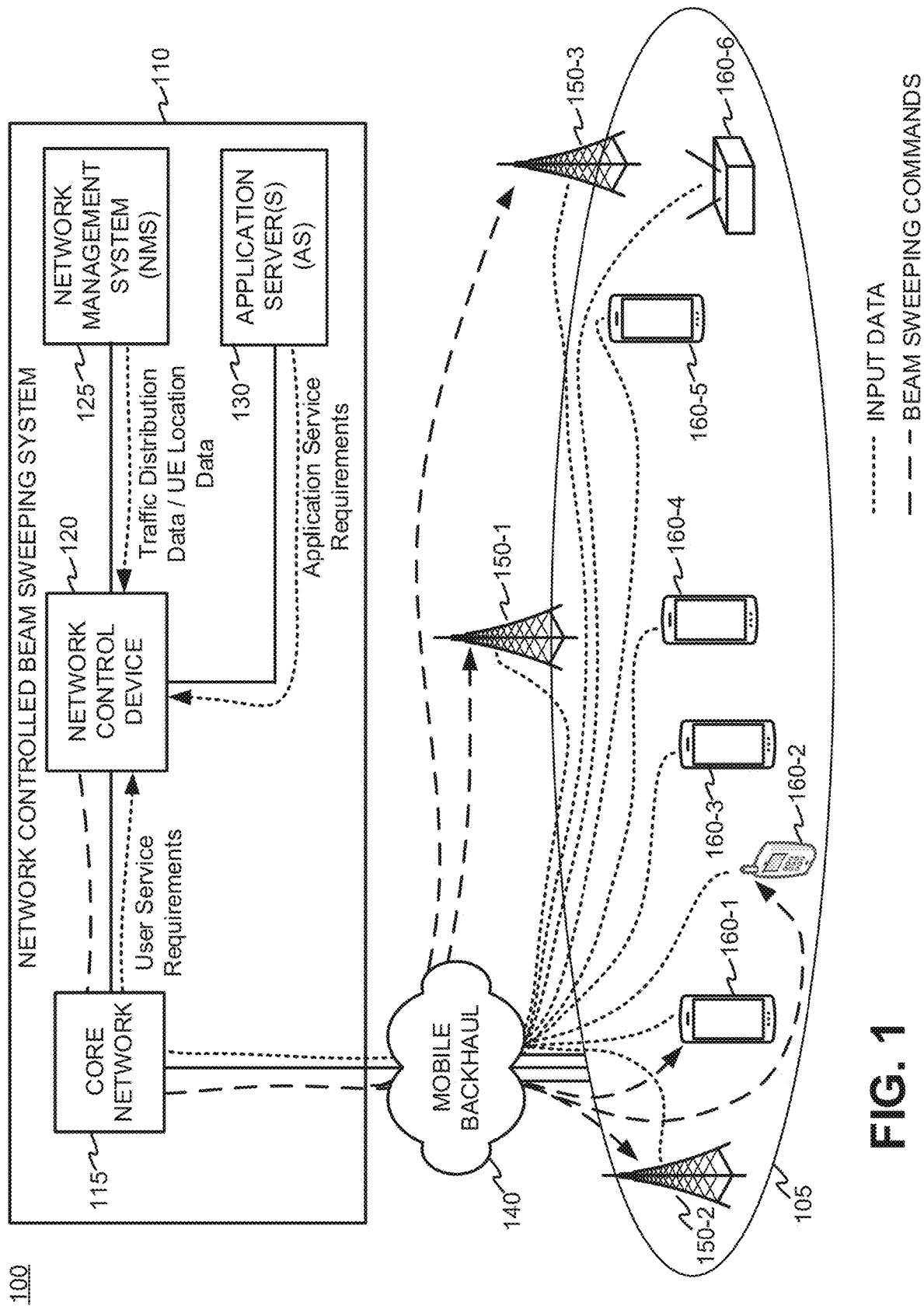
FIG. 1 is a diagram illustrating an exemplary environment including network controlled beam sweeping in a wireless communication system.

FIG. 1 is a diagram illustrating an exemplary environment 100 using network controlled beam sweeping. Environment 100 may include a service area 105 and network controlled beam sweeping system 110. Network controlled beam sweeping system 110 may further include a core network 115, a network control device 120, a network management system (NMS) 125, and an application server (AS) 130. Environment 100 may further include mobile backhaul 140, radio nodes 150 (herein referred to plurally as "radio nodes 150," generically as "radio node 150," and individually as "radio node 150-*x*"), and user equipment (UE) devices 160 (herein referred to plurally as "UE devices 160," generically as "UE device 160," and individually as "UE device 160-*x*"). Environment 100 shown in FIG. 1 may be based on any wireless networking protocols, such as, for example, 4G, 4.XG, and/or 5G standards.

In order to efficiently cover service area 105, network control device 120 may determine beam sweeping patterns for antenna beams associated with one or more transmission reception points (TRP). TRPs may be located at one or more antennas attached to radio nodes 150 and/or UE devices 160. Network control device 120 may have visibility into traffic distributions and network requirements, and may receive various inputs from different sources to calculate beam sweeping commands based on the received inputs. In an embodiment, inputs received by network control device 120 may include the traffic distribution data and other networking requirements (shown as finely dashed lines labeled "INPUT DATA" in FIG. 1). Based on the received inputs, network control device 120 may provide beam sweeping commands to radio nodes 150 and/or UE devices 160 (shown as coarsely dashed lines labeled "BEAM SWEEPING COMMANDS" in FIG. 1). The traffic distribution data may be generated by NMS 125 by collecting traffic data from radio nodes 150 and/or UE devices 160 in service area 105, and subsequently provided to network control device 120. In an embodiment, the networking requirements may include, for example, service requirements associated with one or more applications on one or more UE devices 160 (also referred to herein as "application service requirements") in service area 105. The application service requirements may be provided by AS 130 to network control device 120. Networking requirements may also include requirements defined by a subscription and/or service contract corresponding to a user and the user's associated UE (also referred to herein as "user service requirements"). The user service requirements may be received from the core network 115 (e.g., in a 4G system, the user service requirements may be received by a home subscriber server (HSS)).

Once network control device 120 determines the beam sweeping patterns for antenna beams of radio nodes 150 and/or UE devices 160, beam sweeping commands may be provided to individual radio nodes 150 and/or UE devices 160 via core network 115 and mobile backhaul network 140. Radio nodes 150 may forward beam sweeping commands to respective UE devices 160 over a wireless channel (e.g., a wireless control channel). Additionally, network control device 120 may prioritize particular antenna beams, where high priority beams are reserved to service users having high networking requirements. In an embodiment, high priority beams may be classified as "active" beams. Beams having lower priority than active beams may be classified as "candidate" beams, which may be selected to replace active beams if necessary. Beams having lower priority than active and candidate beans may be classified as "alternative" beams, which may be used as backup beams in case an active beam is temporarily blocked and a suitable candidate beam is unavailable. In addition, the priority of beams may be updated according to the time of day, particular days or dates (e.g., workdays, weekends, holidays, etc.), and/or the time of season (to account for seasonal effects of propagation, seasonal variations of the density of users, and/or variations in objects which may block signal propagation). In addition, network control device 120 may also use prior knowledge of prior beam sweeping patterns to influence the determination of current and/or future beam sweeping patterns. Moreover, the beam sweeping patterns associated with control signaling broadcast between radio nodes 150 and UE devices 160 may be adjusted differently than antenna beams associated with data bearing channels. Additionally, differences between beam sweeping patterns may be based on the beam width of individual antenna beams and/or the number of beam sweeping positions.

Further referring to FIG. 1, radio nodes 150 may exchange traffic data with core network 115 via mobile backhaul network 140. Mobile backhaul network 140 may further exchange traffic between radio nodes 150 without having to go through the core network 115. Core network 115 may further exchange traffic data with network control device 120, NMS 125 and/or AS 130 via a dedicated interface or a wide area network, as discussed further below with respect to FIG. 2. Additionally, radio nodes 150 may be functionally interconnected to each other in addition to being separately connected to mobile backhaul network 140. In an embodiment consistent with the 4G standard (LTE, LTE Advanced), radio nodes 150 may be embodied as eNodeBs, and may be part of an evolved universal mobile telecommunications service (UMTS) Terrestrial Radio Access Network (eUTRAN). In embodiments consistent with the 5G standard, radio nodes 150 may be embodied as gNodeBs. In other embodiments using different wireless standards, the radio nodes 150 may be referred to as base stations. In addition to exchanging traffic with radio node 150 via mobile backhaul network 140, core network 115 may perform control operations for radio nodes 150 and UE devices 160 based at least in part on control plane signals (e.g., Non-Access Stratum functionality). Core network 115 may interface with other core networks through a wide area network (WAN) to exchange traffic data.

Core network 115 may be a networking infrastructure that provides mobility management, session management, multicast functionality, authentication, and packet transport to support UE devices 160 and radio nodes 150 for wireless communication, including collecting data from radio nodes 150 and UE devices 160 so that NMS 125 may generate traffic distribution data for use by network control device 120. Core network 115 may be compatible with known wireless standards which may include, for example, a 4G, 4.XG, 5G, LTE, LTE Advanced, LTE Advanced Pro, Global System for Mobile Communications (GSM), Universal Mobile Telecommunications System (UMTS), IS-2000, etc. For example, core network 115 may be embodied as an evolved packet core (EPC) within a 4G network, or a next-generation core (NG Core) within a 5G network.

Network control device 120 may include one or more network devices, such as, in an embodiment, a self-organizing network controller (SON). Network control device 120 may provide, for example, services to allow the automated planning, configuration, management, optimization and "healing" of a wireless network. Network control device 120 may receive traffic distribution data and network requirements, such as, for example, user service requirements from core network 115 (e.g., in an embodiment, from an HSS in an LTE network), traffic distribution data from NMS 125, and application service requirements data from AS 130. Using such inputs, network control device 120 may compute beam sweeping patterns and provide beam sweeping commands (depicted in coarsely spaced lines in FIG. 1) to radio nodes 150 to improve coverage in service area 105. Additionally, network control device 120 may also provide beam sweeping commands to appropriately configured UE devices 160 to direct the antenna beam(s) of UE device 160 towards a radio node 150 to which it is attached. For example, as shown in FIG. 1, UE device 160-1 and UE device 160-2 may be configured with antennas having steerable beams Accordingly, network control device 120 may send beam sweeping commands (through radio node 150-2) directing the antenna beams of UE devices 160-1, 160-2 to steer towards radio node 150-2 in order to improve wireless network performance.

Network Management System (NMS) 125 may include one or more network devices which receive traffic and diagnostic data from network elements, such as, for example, radio nodes 150, UE devices 160, and other network elements not pictured. The received traffic and diagnostic data may be analyzed to generate traffic distribution data which may define patterns to characterize data and control flows within the network, and provide to network control device 120 qualitative and/or quantitative information regarding each network element (e.g., radio nodes 150 and UE devices 160) in the wireless network. NMS 125 may also receive location data from UE devices 160 and provide the UE location data to network control device 120. In an alternative embodiment, the UE location data may be collected by a geolocation server (not shown in FIG. 1) and provided directly to network control device 120 from the geolocation server, or indirectly from the geolocation sever through NMS 125.

Application server (AS) 130 may include one or more network devices which stores various requirements for applications which may be installed on UE devices 160. For example, a given UE device 160-1 may provide a list of applications to AS 130 as an input. The AS 130 may use a database which determines application service requirements for each received application identified in the received list. For example, AS 130 may store latency requirements, bandwidth requirements, etc., for proper execution of each listed application. Once determined, the application service requirements for UE device 160-1 may be provided to network control device 120 to assist in the determination of the beam sweeping pattern for the antenna beams for radio node 150-2 (the radio node 150 for which UE device 160-1 is attached and exchanging data) and/or the beam sweeping pattern for one or more antenna beams of UE device 160-1, if UE device 160-1 is configured for controllable beam patterns.

Further referring to FIG. 1, mobile backhaul network 140 may be any type network which supports one or more radio nodes 150 for interfacing with core network 115. Mobile backhaul network 140 may include Cell Site Routers (CSRs), Extended Backhaul (EBH) network(s), optical networks which include wavelength division multiplexed (WDM) optical components, multiservice provisioning platforms (MSPPs), metro-Ethernet networks, etc.

Radio nodes 150 may be any type of base station that can be included within any type of radio access network, and can be compatible with known wireless standards. Such standards may include the 4G, 4.XG, Pre-5G, 5G standards, which may further include, for example, LTE, LTE Advanced, LTE Advanced Pro, GSM, UMTS, IS-2000, etc. In some embodiments, radio nodes 150 may be a wireless access point which can service any type of Wi-Fi standard (e.g., any IEEE 801.11x network, where x=a, b, c, g, and/or n), and/or include any other type of wireless network technology for covering larger areas, and may include a mesh network (e.g., IEEE 801.11 s) and/or or a WiMAX IEEE 802.16.

UE devices 160 may include any type of electronic device having communication capabilities, and thus communicate over a wireless network using a variety of different channels, including both wired and wireless connections. UE device 160 may include, for example, a cellular radiotelephone, a smart phone, a tablet, a set-top box (STB), a mobile phone, a Voice over Internet Protocol (VoIP) device, a laptop computer, a palmtop computer, a gaming device, a media player device, a Wi-Fi access point, or a digital camera that includes communication capabilities (e.g., wireless communication mechanisms). UE devices 160 may be compatible with known wireless networking standards. Such standards may include the 4G, 4.XG, Pre-5G, 5G standards, which may further include, for example, LTE, LTE Advanced, LTE Advanced Pro, GSM, UMTS, IS-2000, etc. In some embodiments, UE devices 160 may be a wireless access point acting as a Wi-Fi to cellular bridge that can service any type of Wi-Fi standard (e.g., any IEEE 801.11x network, where x=a, b, c, g, and/or n), and/or include any other type of wireless network technology for covering larger areas, and may include a mesh network (e.g., IEEE 801.11s) and/or or a WiMAX IEEE 802.16.

Figure 2:
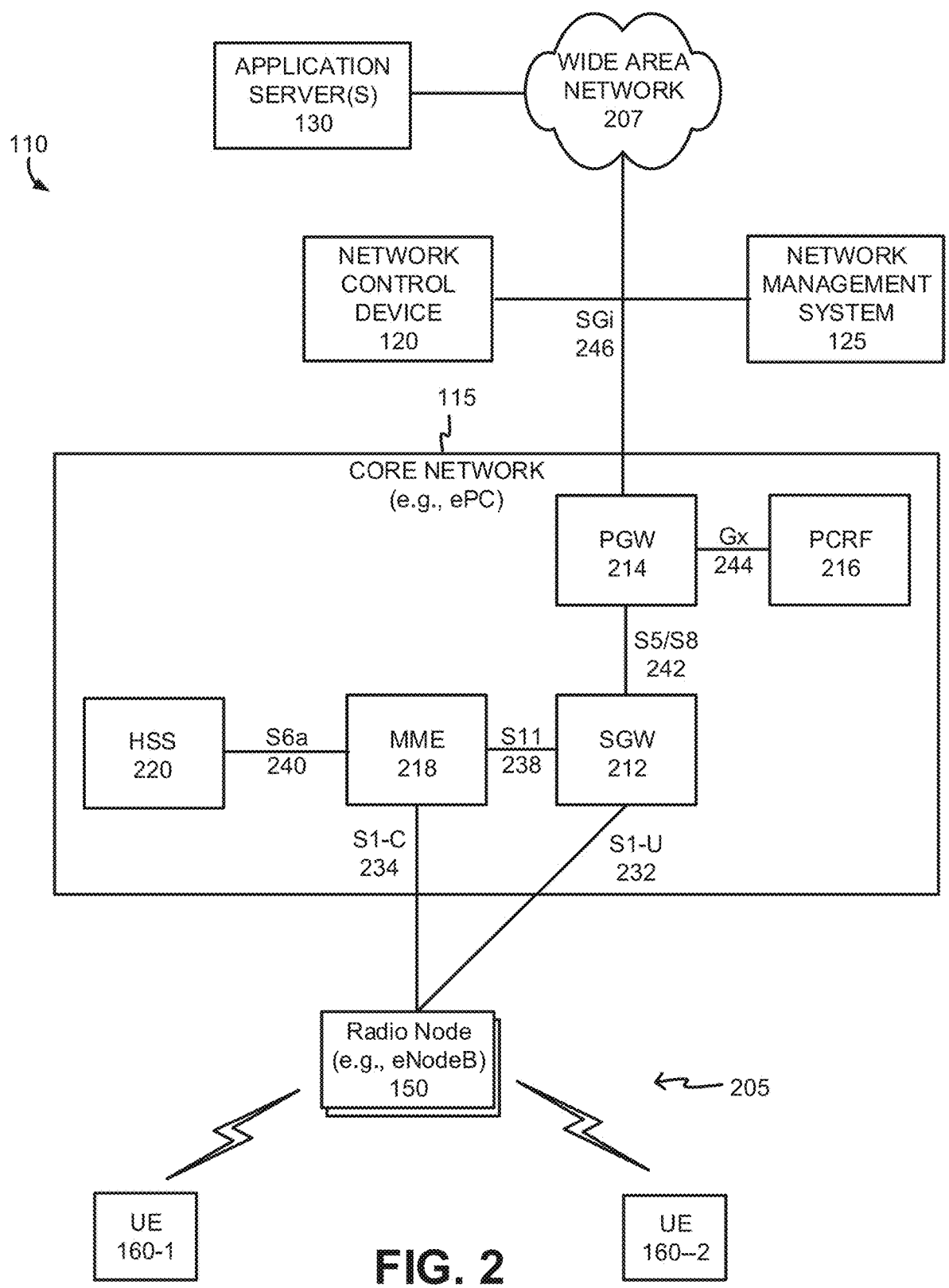
FIG. 2 is a block diagram of an exemplary network controlled beam sweeping system.

FIG. 2 is a block diagram of an exemplary network controlled beam sweeping system 110. In the embodiment shown, core network 115 may be based on a long term evolution (LTE) or an LTE-Advance wireless access network under the 4G standard, and thus be embodied as an EPC. However, depending upon the wireless standard, core network 115 may take other forms. For example, core network 115 may be an NG Core within a 5G network.

In addition to including core network 115, network controlled beam sweeping system 110 may further include network control device 120, NMS 125, and AS 130. Also illustrated is a radio access network RAN 205. In an embodiment consistent with the 4G standard, RAN 205 may be embodied as an UMTS terrestrial network (eUTRAN) 205. RAN 205 may further include radio nodes 150 and UE devices 160.

Core network 115 may include one or more devices that are physical and/or logical entities interconnected via standardized interfaces. Core network 115 provides wireless packet-switched services and wireless IP connectivity to UE devices 160 providing, for example, data, voice, and/or multimedia services. Core network 115 may further include a serving gateway (SGW) device 212, a packet data network gateway (PGW) 214, a policy and charging rules function (PCRF) 216, a mobility management entity (MME) 218, and a home subscriber server (HSS) 220. It is noted that FIG. 2 depicts a representative system with exemplary components and configuration shown for purposes of explanation. Other embodiments may include additional or different network entities in alternative configurations than which are illustrated in FIG. 2.

Further referring to FIG. 2, each radio node 150 may include one or more devices and other components having functionality that allow UE devices 160 to wirelessly connect to RAN 205. Radio node 150 may interface with core network 115 via a S1 interface, which may be split into a control plane S1-C interface 234 and a data plane S1-U interface 232. S1-C interface 234 may interface with MME 218. S1-C interface 234 may be implemented, for example, with a protocol stack that includes a Non-Access Stratum (NAS) protocol and/or Stream Control Transmission Protocol (SCTP). S1-U interface 232 may interface with SGW 212 and may be implemented, for example, using a General Packet Radio Service Tunneling Protocol version 2 (GTPv2). Radio nodes 150 may directly interface with each other via an X2 interface (not shown), implemented, for example, with a protocol stack that includes an X2 application protocol and SCTP.

MME 218 may implement control plane processing for the LTE wireless network. For example, MME 218 may implement tracking and paging procedures for UE devices 160, may activate and deactivate bearers for UE devices 160, may authenticate users of UE devices 160 and/or register UE devices 160 to provide mobile directory number (MDN) values, and may interface to non-LTE radio access networks. A bearer may represent a logical channel with particular quality of service (QoS) requirements. MME 218 may also select a particular SGW 212 for a particular UE device 160-x. A particular MME 218 may interface with other MMEs 218 in core network 215 and may send and receive information associated with UE devices 160, which may allow one MME 218 to take over control plane processing of UE devices 160 serviced by another MME 218, if the other MME becomes unavailable. MME 218 may communicate with SGW 212 through an S11 interface 238. S11 interface 238 may be implemented, for example, using GTPv2. S11 interface 238 may be used to create and manage a new session for a particular UE device 160-x. S11 interface 238 may be activated when MME 218 needs to communicate with SGW 212, such as when the particular UE device 160-x attaches to core network 115, when bearers need to be added or modified for an existing session for the particular UE device 160-x, when a connection to a new PGW 214 needs to created, or during a handover procedure (e.g., when the particular UE device 160-x needs to switch to a different SGW 212).

SGW 212 may provide an access point to and from UE devices 160, may handle forwarding of data packets for UE devices 160, and may act as a local anchor point during handover procedures between radio nodes 150. SGW 212 may interface with PGW 214 through an S5/S8 interface 242. S5/S8 interface 242 may be implemented, for example, using GTPv2.

PGW 214 may function as a gateway to WAN 207 through a SGi interface 246. WAN 207, which may provide various services (e.g., over the top voice services) to UE devices 160. A particular UE device 160-x, while connected to a single SGW 212, may be connected to multiple PGWs 214 one for each packet network with which UE device 160-x communicates.

Alternatively, UE devices 160 may exchange data with WAN 207 though WiFi wireless access point (WAP) (not shown). The WiFi WAP may be part of a local area network, and access WAN 207 through a wired connection via a router. Alternatively, the WiFi WAP may be part of a mesh network (e.g., 801.11s). The WiFi WAP may be part of a local area network, or part of a wide area network (WiMaxx) or a mesh network (801.11s).

PCRF 216 may be responsible for policy control decision-making, as well as for controlling the flow-based charging functionalities in the Policy Control Enforcement Function (PCEF), which may reside in PGW 214. PCRF 216 may provide the QoS authorization (QoS class identifier (QCI) and bit rates) that decides how a certain data flow will be treated in the PCEF and ensures that the treatment is in accordance with the user's subscription profile. PCRF 216 may interface with PGW 214 over a Gx interface 216. The Gx interface 244 may be implemented, for example, using the Diameter protocol.

HSS 220 may store information associated with UE devices 160 and/or information associated with users of UE devices 160. For example, HSS 220 may store user profiles that include registration, authentication, and access authorization information. HSS 220 may also store user service requirements which may specify, for example, bandwidth, latency, and other networking requirements associated with a user's subscription and/or contract. MME 218 may communicate with HSS 220 through an S6a interface 240. S6a interface 240 may be implemented, for example, using a Diameter protocol.

Network control device 120 may receive traffic distribution data and network requirements, such as, for example, user service requirements from HSS 220, traffic distribution data from NMS 125, and application service requirements data from AS 130. Using such inputs, network control device 120 may compute beam sweeping patterns and provide beam sweeping commands to radio nodes 150 to improve coverage in service area 105. Network control device 120 may also provide beam sweeping commands to UE devices 160 having the capability of steering antenna beam(s) of UE device 160 towards a radio node 150 for which it is exchanging data to improve the quality and/or performance of the wireless channel by improving the antenna gain applied to the wireless signal. Network control device 120 may communicate with core network 115 over an SGi interface 246 using the TCP/IP protocol to support external bearers with the PGW 214 exchanging data with WAN 207.

NMS 125 may monitor traffic data and control signals from network elements throughout the network, and processes the data to infer or determine the state of the network and make adjustments to improve performance. In an embodiment, NMS 125 may receive input data from radio node s 150 and UE devices 160 over time to generate time histories of traffic distribution. NMS 125 may process the received input data and generate traffic distribution data describing traffic flows as a function of time, network elements (e.g., data on individual radio nodes 150 and/or UE devices 160), and/or position (e.g., geolocation). The traffic distribution data may be provided to network control device 120 for use in determining beam sweeping commands. NMS 125 may communicate with core network 115 through PGW 214 through an SGi interface using TCP/IP.

Application Server (AS) 130 may receive information identifying applications which are installed on UE devices 160, and using, for example, an internal and/or external database, determine the application service requirements for the identified applications. The application service requirements may include bandwidth, latency, quality of service information, etc., which may be provided to network control device 120 for use in determining beam sweeping commands. AS 130 may communicate with core network 115 through WAN 207 via PGW 214 over through SGi interface 246 using TCP/IP.

While FIG. 2 shows exemplary components of network controlled beam sweeping system 110, in other implementations, network controlled beam sweeping system 110 may include fewer components, different components, differently arranged components, or additional components than depicted in FIG. 2. Additionally or alternatively, one or more components of network controlled beam sweeping system 110 may perform functions described as being performed by one or more other components.

Figure 3:
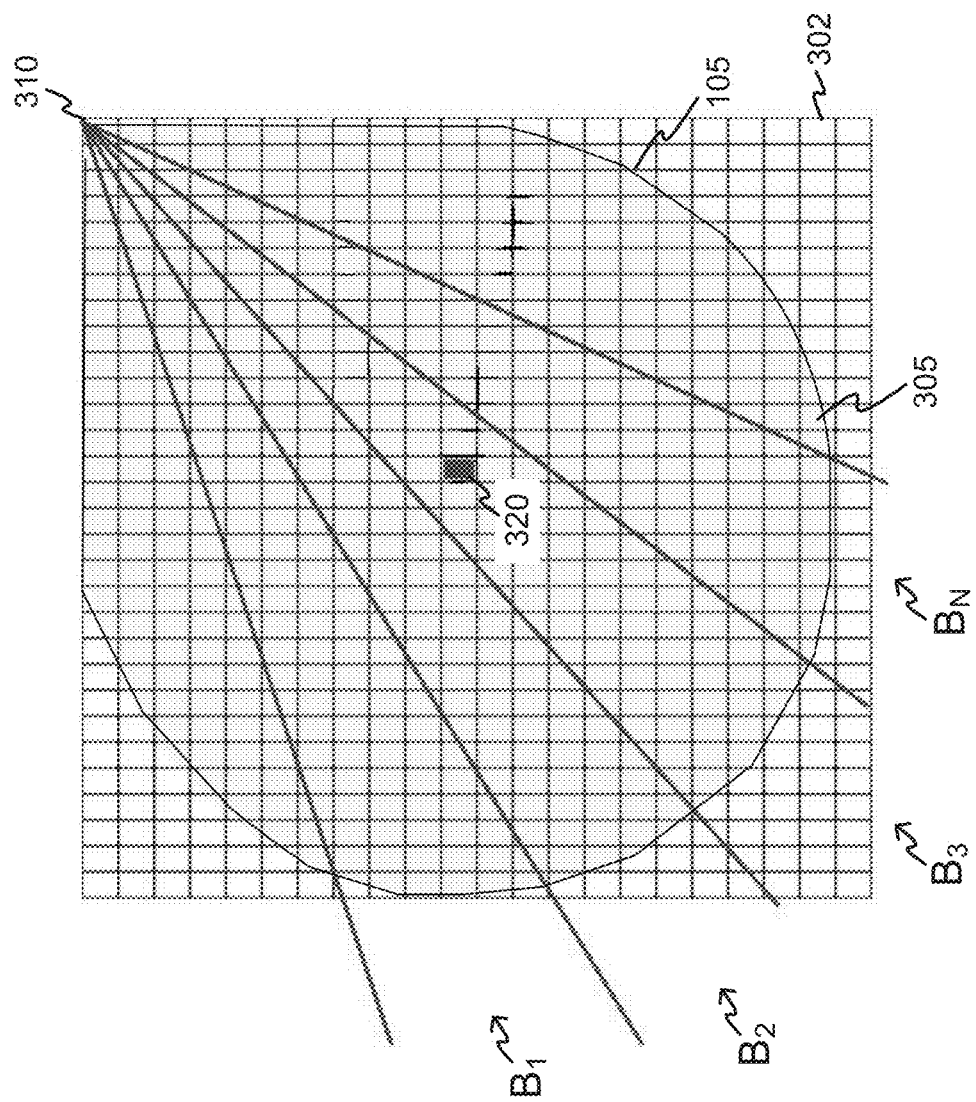
FIG. 3 is a diagram illustrating an exemplary geometry associated with network controlled beam sweeping.

FIG. 3 is a diagram illustrating an exemplary geometry associated with network controlled beam sweeping. FIG. 3 shows an overhead view of service area 105 looking towards the ground 302. Ground 302 may be divided into a plurality of geo-bins 305 to perform analysis for prioritizing the antenna beams to efficiently sweep the antenna beams. A transmit receive point (TRP) 310, which may be considered an antenna phase center for a plurality of antennas (e.g., an electronically steered phased array), serves as the center for transmit and/or receive antenna beams. In other words, TRP 310 may be considered as a source for transmitted signals (e.g., downlink signals if TRP 310 is associated with a radio nodes 150, and uplink signals if TRP 310 is associated with UE devices 160). Also, TRP 310 may be considered a destination for received signals (e.g., uplink signals if TRP 310 is associated with a radio nodes 150, and downlink signals if TRP 310 is associated with UE devices 160).

For ease of illustration, FIG. 3 shows a plurality of different beam sweeping positions $B_j$, where j=1, ..., N, that vary in the azimuth direction (the azimuth angle is an angle to the boresight (i.e., the axis of maximum gain of a directional antenna) of an antenna which lies in a horizontal plane that contains the TPR 310). In an embodiment, the beam sweeping positions may also change in the elevation direction (the elevation angle is an angle to the boresight of the antenna which lies in a vertical plane that contains TRP 310) to direct antenna beams to specific geo-bin 305 (or groups thereof) in service area 105 if desired. Geo-bin 305 is illustrated as a rectangular area in FIG. 3 but as will be understood, geo-bin 305 is not confined to a rigid geometric shape and other geometries for geo-bin 305 are possible. Geo-bin may be any area within an area illuminated by an antenna beam and can be any shape (e.g., circle, hexagon, rectangle, etc.). In some embodiments, geo-bins may be defined as areas occupied by structures, such as, for example, buildings, houses, etc. Further referring to FIG. 3, for ease of illustration, only a limited number of beam sweeping positions $B_j$ (e.g., N=4) are shown in the diagram.

An algorithm to prioritize the beam sweeping pattern of antenna beams may be based on a combination of prior beam sweeping patterns (e.g., historical beam sweeping patterns that may be defined as prior ranking values) and current accumulated evaluations. The current accumulated evaluations may be determined by analyzing geo-bins identified as containing one or more UE devices 160 for each beam sweeping position. As used herein, a geo-bin may "contain" a UE device 160-x when the UE device 160-x is enclosed (or substantially enclosed) by the area defined by the geo-bin. For example, as shown in FIG. 3, geo-bin 320, which lies in beam sweeping position $B_3$, may be identified as having a UE device 160-x contained therein.

Further referring to FIG. 3, for each beam sweeping position $B_j$, a sweeping factor may be calculated by accumulating sweeping weights in each geo-bin within each beam sweeping position $B_j$. Thus, at each beam sweeping position $B_j$, a number of geo-bins, S, may be identified as containing one or more UE devices 160. For each of the identified geo-bins, a weighting factor $W_i$ may be calculated as follows and then summed over all S geo-bins within the beam sweeping position $B_j$. In an embodiment, the weighting factor $W_i$ may be described by the following equation:

$$W_i = f(\text{No\_Users}_i, \text{Traffic}_i, \text{Appln\_Service\_Reqs}_i, \text{User\_Service\_Req}_i); \qquad \text{(Eqn. 1)}$$

where:
- i=1, . . . , S;
- i: index for $i^{th}$ geo-bin identified as having one or more UE devices 160 in Bj;
- S: total number of geo-bins identified as having one or more UE devices 160 in Bj;
- No_Users$_i$: Number of users in the $i^{th}$ geo-bin;
- Traffic$_i$: Traffic Distribution Data associated with the $i^{th}$ geo-bin;
- Appln_Service_Reqs$_i$: Application Service Requirements for each UE device 160 in the $i^{th}$ geo-bin; and
- User_Service_Reqs$_i$: User Service Requirements for the user associated with each UE device 160 in the $i^{th}$ geo-bin.

The function $f(*)$ may be a linear and/or non-linear function relating the weighting factor $W_i$ with traffic distribution data and or networking requirements (e.g., application service requirements and/or user service requirements) for the $i^{th}$ geo-bin containing one or more UE devices 160. For example, in an embodiment, Wi may take the following functional form:

$$W_i = \text{Traffic}_i \times \text{Appln\_Service\_Reqs}_i \times \text{User\_Service\_Req}_i \qquad \text{(Eqn. 1A)}$$

The sweeping factor $SF_j$ for each beam position $B_j$ may be determined by accumulating the weighting factors $W_i$ in each beam position $B_j$, which may be expressed as follows:

$$SF_j = \sum_{i=1}^{S} W_i; j=1, \ldots, N. \qquad \text{(Eqn. 2)}$$

The beam sweeping pattern may be determined by assessing the sweeping priorities based on the sweeping factors $SF_1$ to $SF_N$. The sweeping priorities may be determined by ranking the sweeping factors $SF_1$ to $SF_N$ from highest to lowest, and thus prioritizing the corresponding beam sweeping positions $B_1$ to $B_N$. In other words, a priority value of the beam sweeping positions $B_j$ may be determined as follows:

$$PRI(B_j) = \text{rank}(SF_j), j=1, \ldots, N; \qquad \text{(Eqn. 3)}$$

where:
- PRI(*) may be expressed as a numerical value representing a priority;
- j: index for jth beam position Bj; and
- rank(*): is a function that orders the elements in the argument in ascending order.

A final beam sweeping pattern, designated as $P_{j,t}$, which effective describes the priority of each beam sweeping position $B_j$ at time t, may be determined based on a historical beam sweeping pattern $P_{j,t-1}$, and the current priority $PRI(B_j)$ of beams sweeping position $B_j$. For example, the final beam sweeping pattern $P_{j,t}$ may be expressed as follows:

$$P_{j,t} = \text{rank}(P_{j,t-1} + \alpha PRI(B_j)), \text{ for } j=, \ldots, N; \qquad \text{(Eqn. 4)}$$

where:
- $\alpha$: adjustment factor to modify beam sweeping pattern adaptation speed.

The adjustment factor c may be set between $0<\alpha<1$ to slow down the beam sweeping pattern adaptation speed by "attenuating" the current priorities $PRI(B_j)$ of beam sweeping positions $B_j$, and thus emphasize historical beam sweeping patterns $P_{j,t-1}$. The adjustment factor c may be set greater than 1 (i.e., $1<\alpha$) to increase the beam sweeping pattern adaptation speed by "amplifying" the current priorities $PRI(B_j)$ of beam sweeping positions $B_j$ and thus deemphasizing the historical beam sweeping patterns $P_{j,t-1}$. If the adjustment factor is set to one (i.e., $\alpha=1$), then the historical beam sweeping patterns $P_{j,t-1}$ are equally weighted to the most current priorities $PRI(B_j)$ of beam sweeping positions $B_j$.

Figure 4:
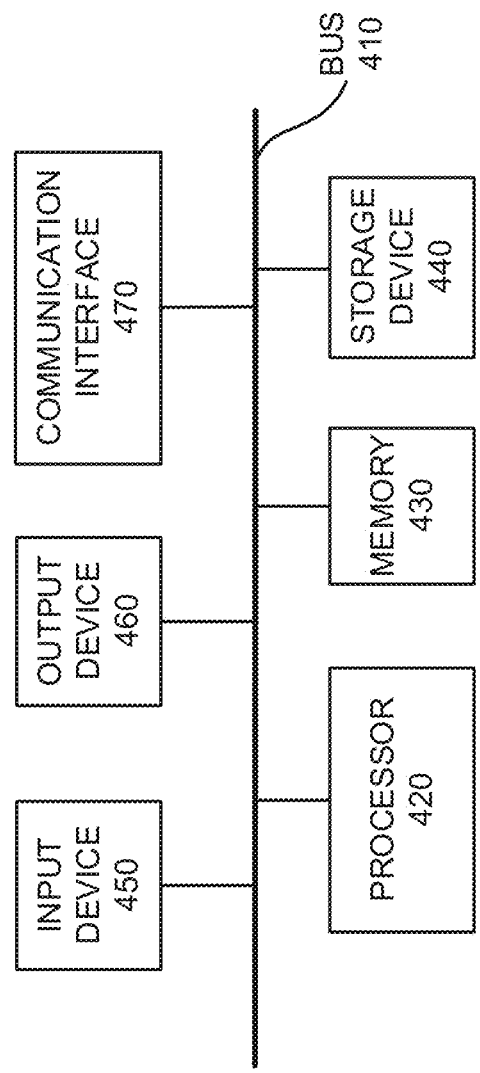
FIG. 4 is a block diagram showing exemplary components of a network control device according to an embodiment.

FIG. 4 is a block diagram showing exemplary components of a network control device 120 according to an embodiment. Network control device 120 may include a processor 420, a memory 430, a storage device 440, an input device 450, an output device 460, and a communication interface 470. The components of network control device 120 may interface (either directly or indirectly) to a bus 410 to exchange data.

Processor 420 may include one or more processors, microprocessors, application specific integrated circuits (ASICs), field programmable gate arrays (FPGAs), and/or other processing logic that may interpret and execute instructions and/or low level logic. Processor 420 may control the operation of network controlled beam sweeping system 110 and its components. Memory 430 may include a random access memory (RAM) or another type of dynamic storage device to store data and instructions that may be used by processor 420. Storage device 440 may include a persistent solid state read/write device, a magnetic medium, a read only memory (ROM) device, and/or optical recording medium and its corresponding drive. Storage device 440 that may store static information and instructions for use by processor 420 and or memory 430.

Communication interface 470 may include a logical component that includes input and/or output ports, input and/or output systems, and/or other input and output components that facilitate the transmission of data to other devices via a network (e.g., mobile backhaul network 140, wide area network 207, etc.). Communication interface 470 may include a network interface cards (e.g., Ethernet card) for wired communications and/or a wireless network interface (e.g., a WiFi) card for wireless communications and/or microwave interfaces for communications to/from other devices over a local area network(s) (LAN), WAN, etc. Such communication standards may include, for example, (e.g., WiFi), WANs, wireless communication (e.g., point to point microwave) and/or one or more wireless public land mobile networks (PLMNs).

As described herein, network control device 120 may perform certain operations in response to processor 420 executing software instructions contained in a computer-readable medium, such as memory 430. A computer-readable medium may be defined as a non-transitory memory device. A non-transitory memory device may include memory space within a single physical memory device or spread across multiple physical memory devices. The software instructions may be read into memory 430 from another computer-readable medium or from another device via communication interface 470. The software instructions contained in memory 430 may cause processor 420 to perform processes described in FIG. 8. Alternatively, hardwired circuitry may be used in place of, or in combination with, software instructions to implement processes described herein. Thus, implementations described herein are not limited to any specific combination of hardware circuitry and software.

While FIG. 4 shows exemplary components of network control device 120, in other implementations, network control device 120 may include fewer components, different components, differently arranged components, or additional components than depicted in FIG. 4. Additionally or alternatively, one or more components of network control device 120 may perform functions described as being performed by one or more other components of network control device 120.

Figure 5:
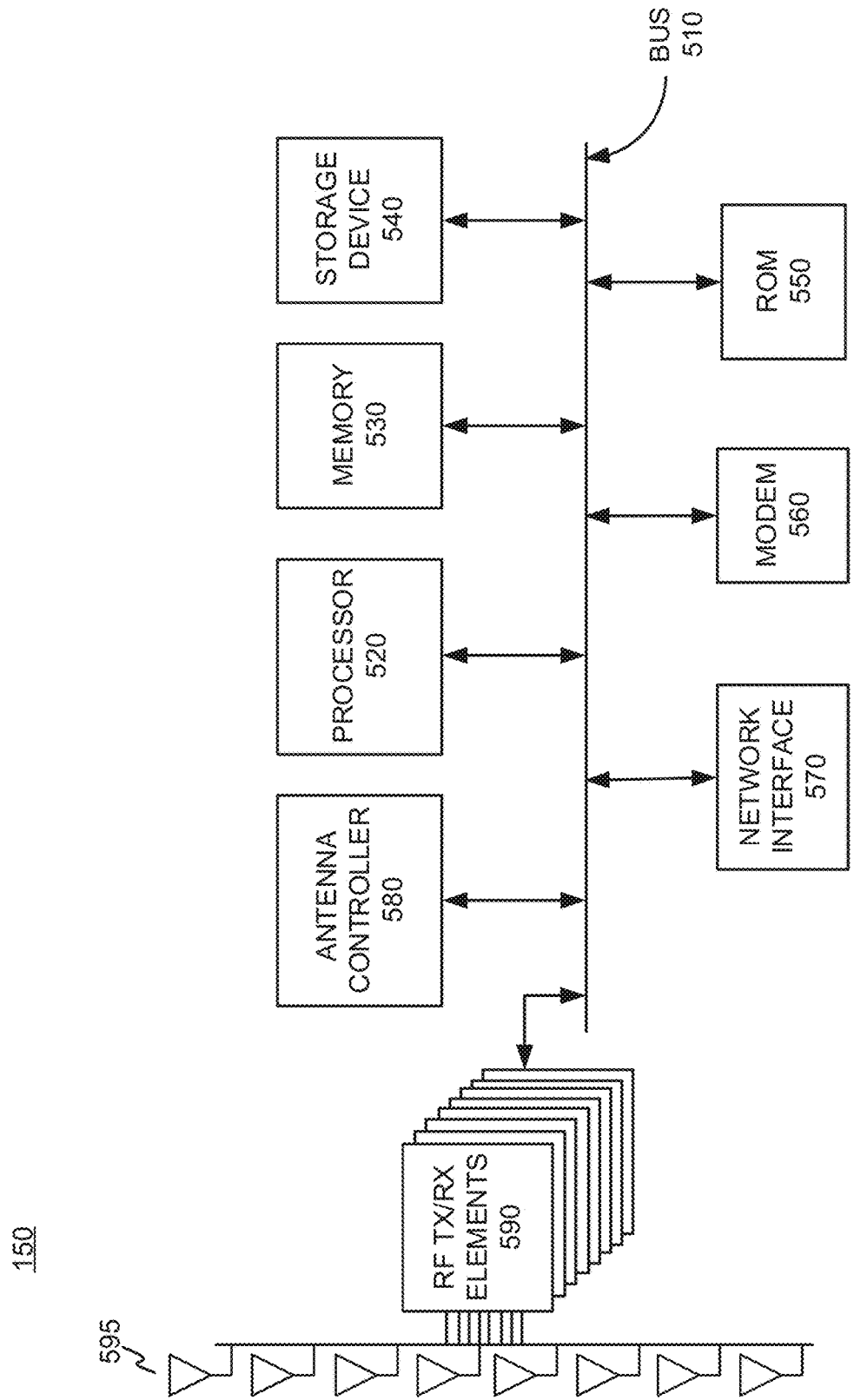
FIG. 5 is a block diagram showing exemplary components of a radio node according to an embodiment.

FIG. 5 is a block diagram showing exemplary components of radio node 150 according to an embodiment. As will be understood, other advanced networks and base stations, such as gNodeBs may be deployed in a manner consistent with the present disclosure. Radio node 150 may provide wireless access to UE devices 160 using various wireless protocols. Such standards may include the 4G, 4.XG, Pre-5G, and 5G standards, which may further include, for example, LTE, LTE Advanced, LTE Advanced Pro, GSM, UMTS, IS-2000, etc. For example, in a 4G-based network, radio node 150 may be embodied as an eNodeB. In a 5G-based network, radio node may be embodied as gNodeB. Radio node 150 may provide wireless and/or wireless network connectivity to other devices connected to core network 115 (through, for example, mobile backhaul network 140), and network devices connected to wide area networks (e.g., the Internet). Radio node 150 may include a processor 520, a memory 530, a storage device 540, a ROM 550, a modem 560, a network interface 570, radio frequency (RF) transmit/receive (TX/RX) elements 590, and an antenna array 595. The components of radio node 150 may interface (either directly or indirectly) to a bus 510 to exchange data.

Processor 520 may include one or more processors, microprocessors, ASICs, FPGAs, and/or other processing logic that may interpret and execute instructions and/or low level logic. Processor 520 may control operation of radio node 150 and its components. Memory 530 may include RAM or another type of dynamic storage device to store data and instructions that may be used by processor 520. Storage device 540 may include a persistent solid state read/write device, a magnetic, and/or optical recording medium and its corresponding drive. ROM 550 may include a ROM device or another type of static storage device that may store static information and instructions for use by processor 520.

Modem 560 may perform various communications and signal processing operations allowing for radio node 150 to efficiently communicate over the wireless network. Modem 560 may also perform processing to facilitate communications over mobile backhaul network 140. Modem 560 may perform signal conditioning (e.g., filtering), signal encoding and decoding orthogonal frequency division multiple access (e.g., OFDMA), signal modulation and demodulation (e.g, binary phase shift keying (BPSK), M-ary phase shift keying (M-PSK), M-ary quadrature amplitude modulation (M-QAM), etc.), and/or error correction for data being transferred over the access stratum. Modem 560 may also operate in the non-access stratum and thus facilitate signaling and coordination with network devices in wireless access network to manage the establishment of communication sessions and for maintaining continuous communications. The modem and processor may function together facilitate the operations of radio node 150 in accordance with a variety of wireless and/or wired communication protocols.

Network interface 570 may include a logical component that includes input and/or output ports, input and/or output systems, and/or other input and output components that facilitate the transmission of data to other devices via mobile backhaul network 140. Such devices may include databases which store information about UE devices 160 and/or core network 115. Network interface 570 may include network interface cards (e.g., Ethernet card) for wired communications and/or a wireless network interface (e.g., a WiFi) card for wireless communications and/or microwave interfaces for communications with other base stations and/or mobile backhaul network 140. Such communication standards may include, for example, local area network(s) (LAN) (e.g., WiFi), wireless wide area networks (WAN), and/or one or more wireless public land mobile networks (PLMNs). The PLMN(s) may include 5G systems, which may operate at higher frequencies, such as, for example, 28 GHz, a Global System for Mobile Communications (GSM) PLMN, a Long Term Evolution (LTE) PLMN, and Advanced LTE PLMN, and/or other types of PLMNs not specifically described herein. Mobile backhaul network 140 may exchange data with the wireless access network(s) to provide access to various servers, gateways, etc. Mobile backhaul network 140 may include a wide area network (WAN), a metropolitan area network (MAN), an intranet, the Internet, a wireless satellite network, a cable network (e.g., an optical cable network), etc.

Antenna controller 580 may accept data and/or commands (e.g. pointing/beamforming commands) from processor 520 and/or modem 560. Data and/or commands provided to antenna controller 580 may be based on beam sweeping commands received by processor 520 (via network through network interface 570) from network control device 120. Antenna controller 580 may also perform TX MIMO encoding to produce multiple channels of data, for a set of the antenna elements in antenna array 595, which may be transmitted over a downlink channel. Signals which have been received over an uplink channel via antenna array 595 may be decoded using RX MIMO decoding to combine streams into fewer data channels or a single received channel. Antenna controller 580 may further apply beamforming weights (which perform relative phase, frequency, and amplitude modulations between the antenna elements) on the transmit data streams to electronically adjust the transmit antenna pattern. Additionally, antenna controller 580 apply beamforming weights on the receive data streams to electronically adjust the receive antenna pattern. Such adjustments may include main lobe pointing for performing beam sweeping. Other adjustments may include "forming nulls." Forming nulls may include pointing side lobe nulls in a particular direction and/or changing the side lobe pattern to alter the placement and/or depth of antenna pattern nulls.

RF TX/RX elements 590 may include discreet RF elements to amplify, frequency demodulate (e.g., down convert) analog channels received the uplink channel through antenna array 595, and convert the analog channels to received digital streams using analog to digital converters. The received digital streams may be passed to antenna controller 580 which may further perform RX MIMO processing to combine MIMO streams. RF TX/RX elements 590 may further process transmit digital streams, which may be TX MIMO, encoded by antenna controller 580 prior to being converted to analog signals using digital to analog converters. The analog signals may be frequency upconverted and amplified for transmission at RF TX/RX elements 590, and subsequently radiated by antenna array 595 over a downlink channel.

Antenna array 595 may include a plurality of antenna elements that serve multiple sectors and/or to provide various antenna characteristics (e.g., antenna beam width, gain, side lobe control, etc.) appropriate for radio node 150 operations. The antenna elements of antenna array 595 may produce individual patterns that may be combined and controlled to act as a single steerable antenna pattern radiating from TCP 310. The antenna elements may have independent channels that may be used for electronic adjustments of both the transmit and receive antenna patterns, and/or for transmit and/or receive MIMO processing to improve wireless channel reliability and/or throughput. In an embodiment, antenna elements 595 may be "grouped" (though physical and/or electronic arrangement) and designated for communication with mobile devices within a particular sector of radio node's 150 overall coverage. The sector may be divided into angular segments (measured in a horizontal plane) pointing in different directions in order to distribute coverage for radio node 150. For example, antenna elements 595 may be grouped in a triangular arrangement so that each side of the triangle serves a 120-degree sector. The antenna pattern, generated by the antenna elements associated with a particular sector, may be characterized by angles (e.g., azimuth and elevation) defined by a sector reference direction for the sector. The sector reference direction may be specified by a vector extending from a reference point associated with the sector.

As described herein, radio node 150 may perform certain operations in response to processor 520 and/or modem 560 executing software instructions contained in a computer-readable medium, such as memory 530. A computer-readable medium may be defined as a non-transitory memory device. A non-transitory memory device may include memory space within a single physical memory device or spread across multiple physical memory devices. The software instructions may be read into memory 530 from another computer-readable medium or from another device via network interface 570. The software instructions contained in memory 530 may cause processor 520 to perform processes to facilitate network controlled beam sweeping of antenna array 595, which may be remotely controlled by network control device 120. Alternatively, hardwired circuitry may be used in place of, or in combination with, software instructions to implement processes described herein. Thus, implementations described herein are not limited to any specific combination of hardware circuitry and software.

Although FIG. 5 shows exemplary components of radio node 150, in other implementations, radio node 150 may include fewer components, different components, differently arranged components, or additional components than those depicted in FIG. 5. Additionally or alternatively, one or more components of radio node 150 may perform the tasks described as being performed by one or more other components of radio node 150.

Figure 6:
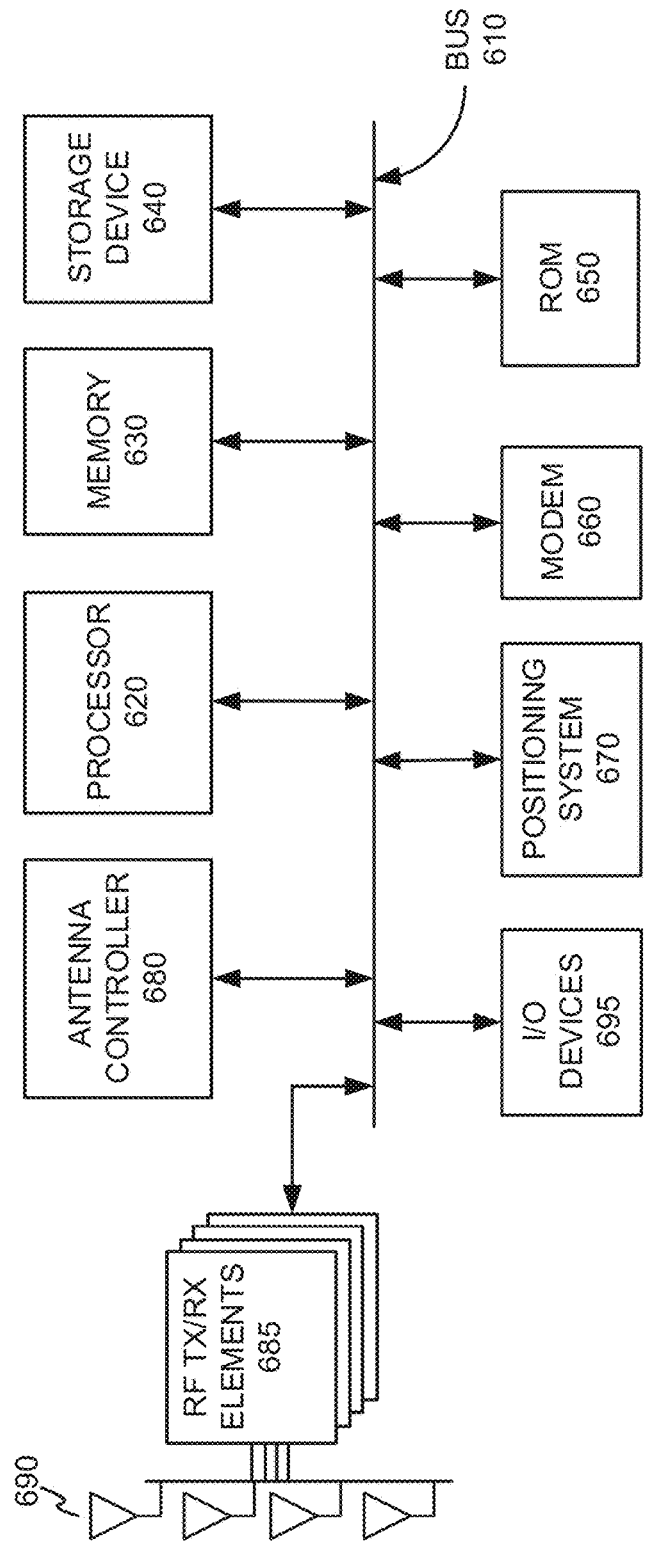
FIG. 6 is a block diagram showing exemplary components of a user equipment (UE) device according to an embodiment.

FIG. 6 is a block diagram showing exemplary components of UE device 160 according to an embodiment. UE device 160 may include any type of electronic device having communication capabilities, and thus communicate over networks using a variety of different channels, including channels having wired and/or wireless connections. UE device 160 may include, for example, a cellular radiotelephone, a smart phone, a tablet, a set-top box (STB), a mobile phone, a Voice over Internet Protocol (VoIP) device, a laptop computer, a palmtop computer, a gaming device, a media player device, or a digital camera that includes communication capabilities (e.g., wireless communication mechanisms). Further referring to FIG. 2, UE device 160 may include bus 610, processor 620, memory 630, storage device 640, ROM 650, modem 660, positioning system 670, antenna controller 680, radio frequency transmit/receive RF TX/RX elements 685, antenna array 690, and I/O devices 695. Bus 610 may interconnect each of the components of UE device 160 either directly or indirectly to exchange commands and/or data.

Processor 620 may include a processor, microprocessor, or processing logic that may interpret and execute instructions. Memory 630 may include a RAM or another type of dynamic storage device that may store information and instructions for execution by processor 620. Storage device 640 may include a persistent solid state read/write device, a magnetic, and/or optical recording medium and its corresponding drive. ROM 650 may include a ROM device or another type of static storage device that may store static information and instructions for use by processor 620.

Modem 660 may perform various communications and signal processing operations allowing for UE device 160 to efficiently communicate over the network. Modem 660 may perform signal conditioning (e.g., filtering), signal encoding and decoding (e.g., OFDMA), signal modulation and demodulation (e.g, BPSK, M-PSK, M-QAM, etc.), and/or error correction for data being transferred over the access stratum. Modem 660 may also operate in the non-access stratum and thus facilitate signaling and coordination with network devices in a wireless access network (e.g., service area 105) to manage the establishment of communication sessions and for maintaining continuous communications.

Positioning system 670 may include a variety of receivers, sensors, and/or processors to provide relative and/or absolute position and orientation data of UE device 160. For example, positioning system 670 may include a satellite navigation system, such as, for example, global positioning system (GPS) component, which may provide position information in relation to a standard reference frame. Position information may include rectangular coordinates in the world geodetic system 1985 (WGS84) frame (in either two or three dimensions), geodic coordinates such as latitude, longitude, and altitude, and/or other suitable positioning data. In another embodiment, positioning system may include an internal measurement unit (IMU) to determine relative displacements based on measured accelerations, and/or gyroscopes to measure angular displacements such as the roll, pitch, and yaw of the UE device 160. Position system 670 may further include sensors, such as magnetometers, which may be used to determine orientation in a reference frame, such as, for example, the angular orientations with respect to magnetic and/or true north.

Antenna controller 680 may accept data for transmission from processor 620 and/or modem 660. Data and/or commands provided to antenna controller 680 may be based on beam sweeping commands received by processor 620 (via the network) from network control device 120. Antenna controller 680 may further perform TX MIMO encoding to produce multiple channels of data for a set of the antenna elements in antenna array 690 which may be transmitted over the uplink channel. Signals which have been received over the downlink channel via antenna array 690 may be decoded using RX MIMO decoding to combine streams into fewer data channels or a single received channel. Antenna controller 680 may further apply beamforming weights (which perform relative phase, frequency, and amplitude modulations between the antenna elements) on the transmit data streams to electronically adjust the transmit antenna pattern. Additionally, antenna controller 680 may apply beamforming weights on the receive data streams to electronically adjust the receive antenna pattern. Such adjustments may include main lobe pointing (the antenna pattern's main lobe may also be referred to herein as the "antenna beam," the "beam," or the "main beam"). Other adjustments may include "forming nulls" which may include pointing side lobe nulls in a particular direction and/or changing the side lobe pattern to alter the placement and/or depth of antenna pattern nulls.

RF TX/RX elements 685 may include discreet RF elements to amplify, frequency demodulate (e.g., down convert) analog channels received over antenna array 690, and convert the analog channels to received digital streams using analog to digital converters. The received digital streams may be passed to antenna controller 680 which may further perform RX MIMO processing to combine MIMO streams. RF TX/RX elements 685 may further process transmit digital streams, which may be TX MIMO encoded by antenna controller 680 prior to being converted to analog signals using digital to analog converters. The analog signals may be frequency upconverted and amplified for transmission by RF TX/RX elements 685, and subsequently radiated by antenna array 690 over an uplink channel.

Antenna array 690 may include at least two antenna elements which have independent channels that may be used for electronic adjustments of both the transmit and receive antenna patterns, and/or also for transmit and/or receive MIMO processing to improve wireless channel reliability and/or throughput. The antenna elements of antenna array 690 may produce individual patterns that may be combined and controlled to act as a single steerable antenna pattern radiating from a TRP associated with UE device 160.

I/O devices 695 may include one or more mechanisms that permit an operator to input information to UE device 160, such as, for example, a keypad or a keyboard, a microphone, voice recognition and/or biometric mechanisms, etc. I/O devices 695 may also include one or more mechanisms that output information to the operator, including a display (e.g, a liquid crystal display), a speaker, etc.

UE device 160 may perform certain operations or processes, as may be described in detail below. UE device 160 may perform these operations in response to processor 620 executing software instructions contained in a computer-readable medium, such as memory 630. A computer-readable medium may be defined as a physical or logical memory device. A logical memory device may include memory space within a single physical memory device or spread across multiple physical memory devices. The software instructions may be read into memory 630 from another computer-readable medium, such as storage device 640, or from another device via the network. The software instructions contained in memory 630 may cause processor 620 to perform processes to facilitate network controlled beam sweeping of antenna array 595, which may be remotely controlled by network control device 120. Alternatively, hardwired circuitry may be used in place of or in combination with software instructions to implement processes consistent with the principles of the embodiments. Thus, exemplary implementations are not limited to any specific combination of hardware circuitry and software.

The configuration of components of UE device 160 illustrated in FIG. 6 is for illustrative purposes only. It should be understood that other configurations may be implemented. Therefore, UE device 160 may include additional, fewer and/or different components than those depicted in FIG. 6.

Figure 7:
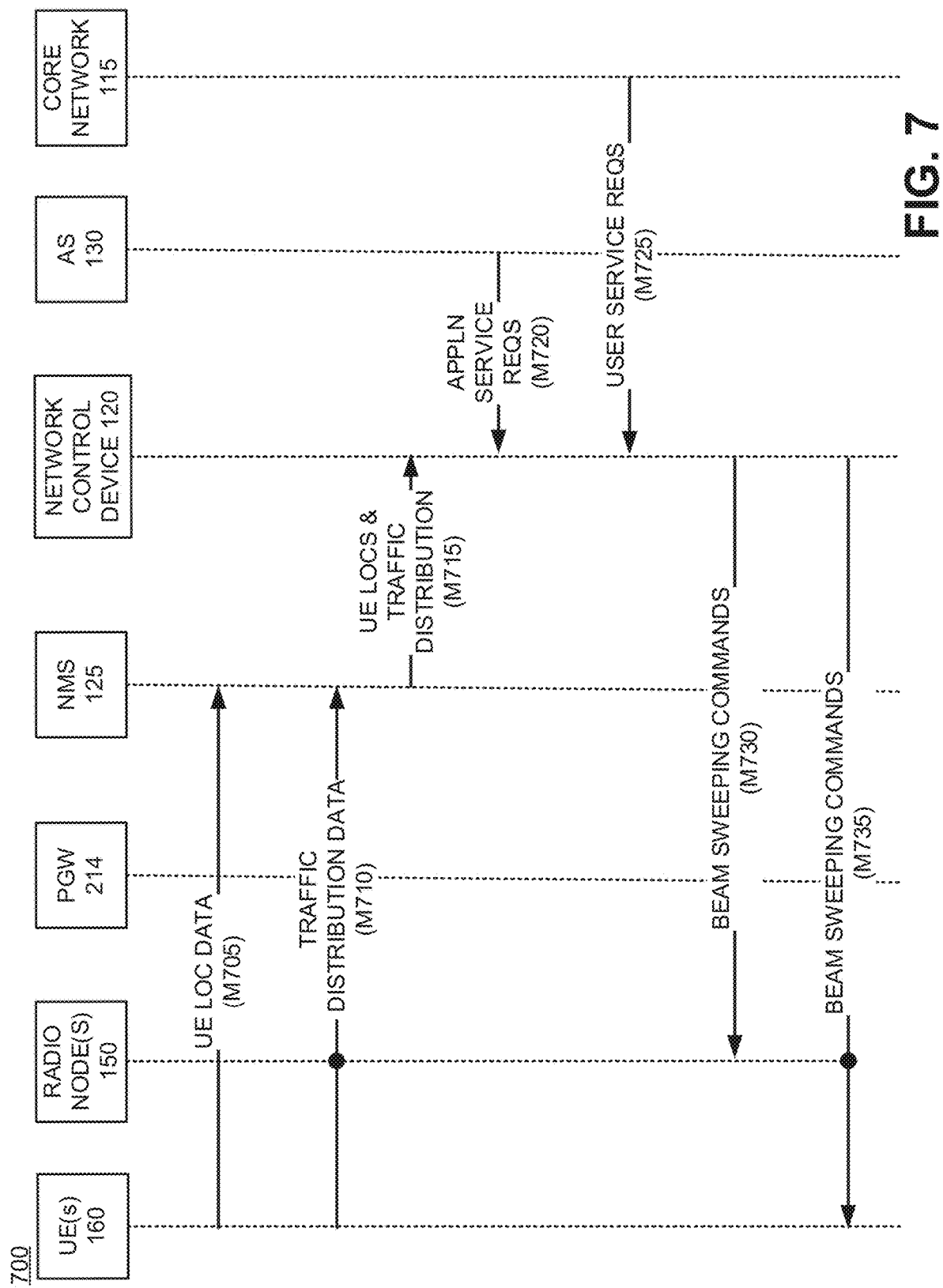
FIG. 7 is an exemplary signal flow diagram illustrating communications between network entities for network controlled beam sweeping.

FIG. 7 is an exemplary signal flow diagram 700 illustrating communications between network entities for network controlled beam sweeping. As shown, one or more UE device(s) 160 may send location data to NMS 125 (M705) via radio node 150 and PGW 214. The location data from one or more UE device(s) 160 may be collected directly by NMS 125, or by an geolocation server (not shown) and subsequently passed on to NMS 125 through the geolocation server. The geolocation server may be a separate device external to NMS 125. Alternatively, the geolocation server may be a module within NMS 125 based on hardware and/or software modules. One or more UE device(s) 160 and/or one or more radio node(s) 150 may send traffic distribution data to NMS 125 (M710). NMS 125 may process and format the UE location data and/or the traffic distribution data, for forwarding to network control device 120 (M715). AS 130 may send application service requirements for applications associated with UE device(s) 160 to network control device 120 (M720). Core network 115 (e.g., HSS 220 in a 4G network) may send user service requirements associated with UE device(s) 160 to network control device 120. Network control device 120 processes the received inputs from messages M705 through M725, and generates beam sweeping commands for one or more UE device(s) 160 and/or one or more radio node(s) 150. The beam sweeping commands for radio node(s) 150 may be sent to radio node(s) 150 (M730) and to UE device(s) 160 via radio node(s) 150 (M735).

Figure 8:
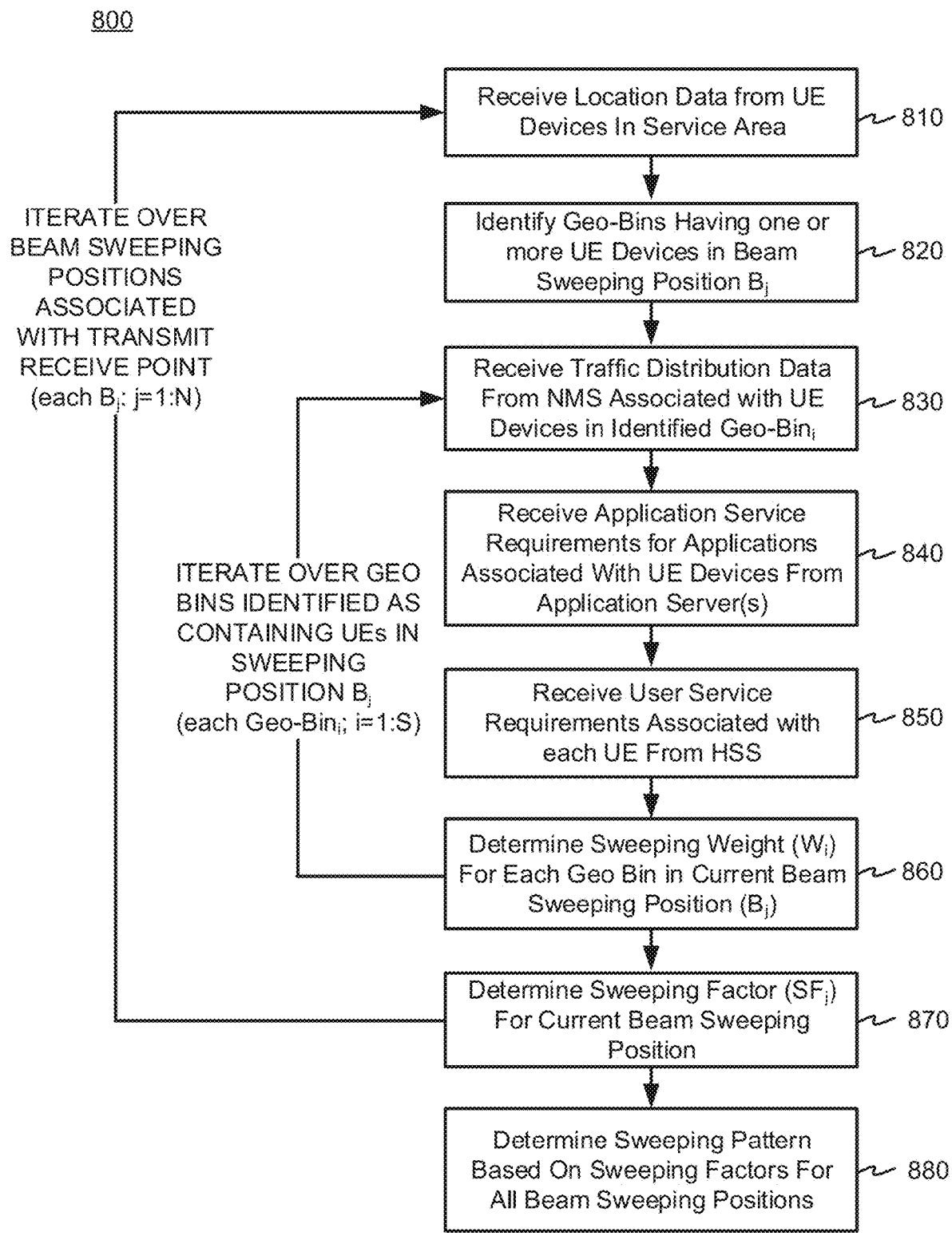
FIG. 8 is a flow chart showing an exemplary process for the network control device to facilitate network controlled beam sweeping.

FIG. 8 is a flow chart showing an exemplary process 800 for the network control device 120 to facilitate network controlled beam sweeping. In an embodiment, process 800 may execute on processor 420 residing in network control device 120. As described in detail below, in FIG. 8, processor 420 may iterate over N beam sweeping positions Bj, where j=1, . . . N, associated with TRP 310. Iterations over all the beam sweeping positions Bj is referred to herein as the "outside loop." As shown in FIG. 8, Blocks 810 through 870 may be included in the outside loop.

Initially, the outside loop may begin by processor 420 receiving location data from UE device(s) 160 in service area 105 (Block 810). The location data may be collected from each UE device 160 in service area 150, and consolidated in NMS 125 and/or geolocation server. Once consolidated by NMS 125 and/or geolocation server, the UE location data may be provided to network control device 120. Using the UE location data, processor 420 may identify, at each beam sweeping position Bj, a total of S geo-bins 305 having UE device(s) 160 located therein (Block 820). Once identified, processor 420 may iterate over all S geo-bins (e.g., geo-bin 320; FIG. 3) identified as containing UEs 160 in beam sweeping position Bj. Iterations over all S geo-bins 305 is referred to herein as the "inside loop." As shown in FIG. 8, Blocks 830 through 860 may be included in the inside loop.

Initially, the inside loop may begin by having processor 420 receiving traffic distribution data associated with UE device(s) 160 in service area 105 (Block 830). The traffic distribution data may be received from NMS 125, and may define data traffic patterns to provide quantitative and/or qualitative information of network data traffic for each geo-bin 305 of interest. Processor 420 may receive networking requirements associated with UE device(s) 160. In an embodiment, the received networking requirements may include receiving, from AS 130, performance requirements corresponding with applications associated with UE device(s) 160 (Block 840). Performance requirements corresponding with applications associated with UE device(s) 160, also referred to herein as "application service requirements" as shown in Block 840 of FIG. 8. In an embodiment, the received networking requirements may further include receiving, from core network 115 (e.g., HSS 220 in a 4G network), service requirements associated with UE device(s) 160 (Block 850). Service requirements associated with UE device(s) 160 may be referred to herein as "user service requirements" as shown in Block 850 of FIG. 8.

Processor 420 may determine a sweeping weight $W_i$ for each identified geo-bin 305, where the sweeping weight may be based on the traffic distribution data and the networking requirements (e.g., the application service requirements and the user service requirements) associated with the UE device(s) 160 in each geo-bin 305 for the current beam sweeping position $B_j$ (Block 860). In an embodiment, the sweeping weight $W_i$ may be determined by Eqn. 1 described above. The inner loop may be repeated until all identified geo-bins$_i$ (i=1, . . . , S) have been processed in beam sweeping position $B_j$. As shown in FIG. 8, the inner loop may be bound by Block 860, and returns execution to Block 830 to process the next identified geo-bin$_{i+1}$ in beam sweeping position $B_j$.

Processor 420 may then determine a sweeping factor for each beam sweeping position $B_j$ based upon the sweeping weights Wi, i=1, . . . , S (Block 870). The sweeping factor $SF_j$ for beam position $B_j$ may be determined using Eqn. 2 described above. As shown in FIG. 8, the outer loop may be bound by Block 870, and returns execution to Block 810 to process the next beam sweeping position $B_{j+1}$.

Once all N beam sweeping positions have been processed, and sweeping factors $SF_j$ (j=1, . . . N) have been computed for all of the beam sweeping positions $B_j$, processor 420 may determine a beam sweeping pattern based on the sweeping factors $SF_j$ (j=1, . . . N) for all N beam sweeping positions (Block 880). In an embodiment, processor 420 may determine the beam sweeping pattern by ordering the sweeping factors associated with each beam sweeping position, and then determining a priority value of each beam sweeping position based on the ordering. This may be performed by determining the rank of the sweeping factors as shown in Eqn. 3 described above. In an embodiment, processor 420 may classify each beam sweeping position based on the priority value, wherein the classification comprises an active beam, a candidate beam, and an alternative beam. In an embodiment, high priority beams may be classified as "active" beams. Beams having lower priority than active beams may be classified as "candidate" beams, which may be selected to replace active beams if necessary. Beams having lower priority than active and candidate beans may be classified as "alternative" beams, which may be used as backup beams in case an active beam is temporarily blocked and a suitable candidate beam is unavailable.

In an embodiment, processor 420 may determine a beam sweeping pattern by adjusting the priority value of each beam sweeping position with an adaptation speed parameter (e.g., $\propto PRI(B_j)$ as shown in Eqn. 4), and then determining a composite value by combining each adjusted priority value with prior beam sweeping pattern (e.g., $P_{j,t-1}+\propto PRI(B_j)$ as shown in Eqn. 4). Processor 420 may order each composite value (e.g., by using a rank function) associated with a beam sweeping position to determine an updated beam sweeping pattern as described above in Eqn. 4.

Once the beam sweeping pattern is determined, processor 420 may provide beam sweeping commands to control the beam sweeping pattern for one or more radio node(s) 150 and/or one or more UE device(s) 160 in the service area 105. For example, for radio node(s) 150, beam sweeping commands may be provided over the network and received by network interface 570 in radio node(s) 150, and be used by antenna controller 580 to control antenna array 595. In another example, the beam sweeping commands may be provided over the network and received by modem 660 in UE device(s) 160, and be used by antenna controller 680 to control antenna array 690.

The foregoing description of implementations provides illustration and description, but is not intended to be exhaustive or to limit the invention to the precise form disclosed. Modifications and variations are possible in light of the above teachings or may be acquired from practice of the invention. For example, while series of signals and/or blocks have been described with regard to FIGS. 7 and 8, the order of the signals and/or blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, at a network control device, geolocation data associated with user equipment (UE) devices within a service area, wherein the geolocation data is provided by a positioning system within the UE devices;
   identifying, at each beam sweeping position of a plurality of beam sweeping positions, geo-bins having at least one UE device located therein;
   receiving, at the network control device, networking requirements and traffic distribution data associated with the at least one UE device in each identified geo-bin;
   determining a sweeping factor for each beam sweeping position; and
   determining a beam sweeping pattern for all the beam sweeping positions based on the sweeping factors.

2. The method of claim 1, further comprising:
- determining a sweeping weight for each identified geo-bin, wherein the sweeping weight is based on the networking requirements and the traffic distribution data associated with the at least one UE device in the identified geo-bin; and
- providing commands, to at least one of a radio node or the UE device in the service area, wherein the provided commands control the beam sweeping pattern for at least one of the radio node or the UE device.

3. The method of claim 1, wherein receiving networking requirements associated with the at least one UE device further comprises:
- receiving, from an application server (AS), performance requirements corresponding with an application associated with the at least one UE device.

4. The method of claim 1, wherein receiving networking requirements associated with the at least one UE device further comprises:
- receiving, from a core network, service requirements associated with the at least one UE device.

5. The method of claim 1, wherein determining the beam sweeping pattern for all the beam sweeping positions further comprises:
- ordering the sweeping factors associated with each beam sweeping position; and
- determining a priority value of each beam sweeping position based on the ordering.

6. The method of claim 5, wherein determining the beam sweeping pattern for all the beam sweeping positions further comprises:
- adjusting the priority value of each beam sweeping position with an adaptation speed parameter;
- determining a composite value by combining each adjusted priority value with a prior beam sweeping pattern; and
- ordering each composite value associated with a beam sweeping position to determine an updated beam sweeping pattern.

7. The method of claim 5, further comprising:
- classifying each beam sweeping position based on the priority value, wherein the classification comprises an active beam, a candidate beam, and an alternative beam.

8. A network control device, comprising:
a network interface;
a memory configured to store instructions; and
a processor coupled to the network interface and the memory, wherein the processor is configured to execute the instructions stored in the memory that cause the processor to:
receive geolocation data associated with user equipment (UE) devices within a service area, wherein the geolocation data is provided by a positioning system within the UE devices,
identify, at each beam sweeping position of a plurality of beam sweeping positions, geo-bins having at least one UE device located therein,
receive networking requirements and traffic distribution data associated with the at least one UE device in each identified geo-bin,
determine a sweeping factor for each beam sweeping position, and
determine a beam sweeping pattern for all the beam sweeping positions based on the sweeping factors.

9. The network control device of claim 8, wherein the instructions further cause the processor to:
- determine a sweeping weight for each identified geo-bin, wherein the sweeping weight is based on the networking requirements and the traffic distribution data associated with the at least one UE device in the identified geo-bin; and
- provide commands to at least one of a radio node or the UE device in the service area, wherein the provided commands control the beam sweeping pattern for at least one of the radio node or the UE device.

10. The network control device of claim 8, wherein the instructions to receive networking requirements associated with the at least one UE device further cause the processor to:
- receive, from an application server, performance requirements corresponding with applications associated with the at least one UE device.

11. The network control device of claim 8, wherein instructions to receive networking requirements associated with the at least one UE device further cause the processor to:
- receive, from a core network, service requirements associated with the at least one UE device.

12. The network control device of claim 8, wherein the instructions to determine the beam sweeping pattern for all the beam sweeping positions further cause the processor to:
- order the sweeping factors associated with each beam sweeping position; and
- determine a priority value of each beam sweeping position based on the order.

13. The network control device of claim 12, wherein the instructions to determine the beam sweeping pattern for all the beam sweeping positions further cause the processor to:
- adjust each priority value of each beam sweeping position with an adaptation speed parameter;
- determine a composite value by combining each adjusted priority value with a prior beam sweeping pattern; and
- order each composite value associated with a beam sweeping position to determine an updated beam sweeping pattern.

14. The network control device of claim 12, wherein the instructions further cause the processor to:
- classify each beam sweeping position based on the priority value, wherein the classification comprises an active beam, a candidate beam, and an alternative beam.

15. The network control device of claim 8, wherein the network control device comprises a self organizing network controller.

16. The network control device of claim 8, wherein the network interface communicates over a network based on at least one of a fourth generation (4G) or fifth generation (5G) networking standard.

17. A non-transitory computer readable medium comprising instructions, which, when executed by a processor, cause the processor to:
receive, at a network control device, geolocation data associated with user equipment (UE) devices within a service area, wherein the geolocation data is provided by a positioning system within the UE devices;
identify, at each beam sweeping position of a plurality of beam sweeping positions, geo-bins having at least one UE device located therein;
receive, at the network control device, networking requirements and traffic distribution data associated with the at least one UE device in each identified geo-bin;

determine a sweeping factor for each beam sweeping position; and determine a beam sweeping pattern for all the beam sweeping positions based on the sweeping factors.

18. The non-transitory computer readable medium of claim 17, wherein the instructions further cause the processor to:

determine a sweeping weight for each identified geo-bin, wherein the sweeping weight is based on the networking requirements and the traffic distribution data associated with the at least one UE device in the identified geo-bin; and provide commands to at least one of a radio node or the UE device in the service area, wherein the provided commands control the beam sweeping pattern for at least one of the radio node or the UE device.

19. The non-transitory computer readable medium of claim 17, wherein the instructions to receive networking requirements associated with the at least one UE device further cause the processor to:

receive, from an application server (AS), performance requirements corresponding with applications associated with the at least one UE device.

20. The non-transitory computer readable medium of claim 17, wherein the instructions to receive networking requirements associated with the at least one UE device further cause the processor to:

receive, from a core network, service requirements associated with at the at least one UE device.

* * * * *